United States Patent [19]

Ward et al.

[11] Patent Number: 4,900,339

[45] Date of Patent: Feb. 13, 1990

[54] AMMONIA FLOW DIVIDER

[76] Inventors: David P. Ward, 1528 Stemmons Ave., Dallas, Tex. 75208; James S. Jones, 45 Crown Pl., Richardson, Tex. 75080

[21] Appl. No.: 325,397

[22] Filed: Mar. 20, 1989

[51] Int. Cl.4 ............................................. B01D 45/12
[52] U.S. Cl. ....................................... 55/204; 55/337; 55/424; 55/459.1; 209/211; 210/512.1
[58] Field of Search ........................ 55/1, 36, 191, 204, 55/337, 459.1, 424; 209/211; 210/512.1

[56] References Cited

U.S. PATENT DOCUMENTS

| | | | |
|---|---|---|---|
| 739,263 | 9/1903 | Kenney | 55/459.1 |
| 907,769 | 12/1908 | Fuller | 261/79.2 |
| 2,200,620 | 5/1940 | Findley | 237/12.3 |
| 2,420,356 | 5/1947 | Compa | 55/55 |
| 2,757,581 | 8/1956 | Freeman et al. | 92/28 |
| 2,757,582 | 8/1956 | Freeman et al. | 92/28 |
| 2,816,490 | 12/1957 | Boadway et al. | 92/28 |
| 2,819,795 | 1/1958 | Fontein et al. | 209/211 |
| 2,849,930 | 9/1958 | Freeman et al. | 92/28 |
| 3,200,568 | 8/1965 | McNeil | 55/204 |
| 3,320,727 | 5/1967 | Farley | 55/337 |
| 3,516,799 | 6/1970 | Dotson | 23/283 |
| 3,807,142 | 4/1974 | Rich et al. | 55/191 |
| 3,978,681 | 9/1976 | Kjelgaard et al. | 62/51 |
| 3,996,027 | 12/1976 | Schnell et al. | 55/36 |
| 4,002,432 | 1/1977 | Brice et al. | 23/284 |
| 4,069,029 | 1/1978 | Hudson | 62/51 |
| 4,090,956 | 5/1978 | Benzon | 209/211 |
| 4,175,394 | 11/1979 | Wiesboeck | 62/51 |
| 4,196,677 | 4/1980 | Siebert | 111/7 |
| 4,273,563 | 6/1981 | Fadda et al. | 55/204 |
| 4,345,919 | 8/1982 | Wilkinson et al. | 55/41 |
| 4,458,609 | 7/1984 | Tofte | 111/7 |
| 4,596,586 | 6/1986 | Davies et al. | 55/52 |

*Primary Examiner*—Bernard Nozick
*Attorney, Agent, or Firm*—Daniel V. Thompson

[57] ABSTRACT

An apparatus for dividing the vapor and liquid components of a two-phased flow of anhydrous ammonia includes an upper chamber, a lower chamber and a partition member interposed between the upper and lower chambers. The partition member includes walls defining an aperture between the upper and lower chambers. At least one vapor outlet extends through the top of the upper chamber, at least one liquid outlet extends through the bottom of the lower chamber, and at least one two-phase inlet extends through the lower chamber disposed to admit two-phase flow in tangential relation to an internal surface of the lower chamber.

23 Claims, 2 Drawing Sheets

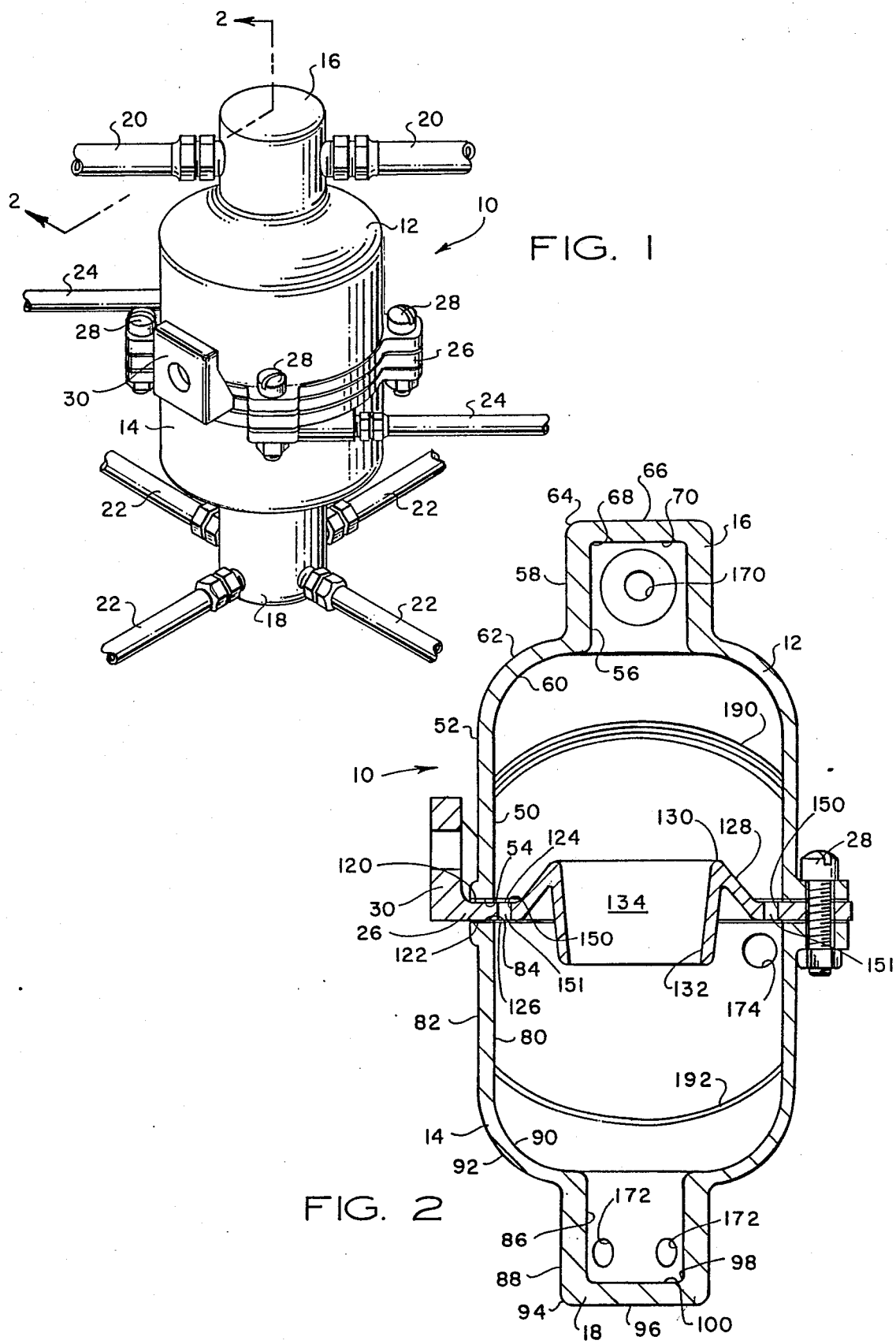

AMMONIA FLOW DIVIDER

TECHNICAL FIELD

This invention relates to the application of anhydrous ammonia as used as plant food for row crops, and more particularly to a device for dividing ammonia vapor away from row crops to prevent leaf burn while side dressing.

BACKGROUND OF THE INVENTION

The seasonal timing of agricultural ammonia application is primarily controlled at the present time by economic factors. Due to the short growing period in much of the corn growing region, application in the fall season is most common, and then typically an additional application in the spring season prior to planting is attempted. Occasionally, however, weather conditions prevent a spring pre-plant application, such that an application into the sides of the rows after planting, known as a "side dress application", is required.

Another factor which may effect the seasonal timing of ammonia applications relates to increasing awareness that heavy fall season applications of ammonia may have an effect on streams and reservoirs of surface water runoff from fields where ammonia has been applied. The runoff water from ammonia-enriched fields can in some situations upset the nutrient balance in the streams and reservoirs causing distortions in plant and animal life. Thus, it is believed likely that quantity limits per application will be imposed by government regulation in some geographical growing areas, which in turn will encourage increased utilization of side dressing applications.

A problem that has arisen with side dress applications, however, arises from the fact that the injection of ammonia in side dressing is necessarily shallower than in conventional fall and spring pre-plant applications. Shallow injection would be acceptable if the ammonia stream were primarily in the form of a liquid with little vapor, but the typical high vapor to liquid ratio results in the escape of ammonia, causing unacceptable leaf burn. Ammonia, being a liquified vapor, has a great expansion rate from the tank to the applicator knives where it is injected in the soil, and typically 70–75% of the ammonia by weight represents less than 1% of the total volume injected.

SUMMARY OF THE INVENTION

The apparatus of the present invention receives metered ammonia from a manifold in such a way as to cause a continual change in the direction of the ammonia to cause the lighter portion (vapor) to separate from the heavier portion (liquid). The apparatus has means to discharge liquid out the lower portion of the device for side dressing and means to discharge vapor through the upper portion which is injected into the furrows between the rows of plants where leaf burn is not a factor.

PRIOR ART

We are not aware of any prior art showing ammonia flow separation specifically for side dressing; however, we are aware of prior art that separates ammonia vapor from liquid: U.S. Pat. No. 3,978,681, Sept. 7, 1976, to Kjelgaard, et al; and U.S. Pat. No. 4,175,394, Nov. 27, 1979 to Wiesboeck.

BRIEF DESCRIPTION OF THE DRAWINGS

FIG. 1 is a perspective view of apparatus constructed in accordance with the invention;

FIG. 2 is a sectional view taken along lines 2—2 of FIG. 1; and

DETAILED DESCRIPTION OF THE PREFERRED EMBODIMENT

Figure 3:
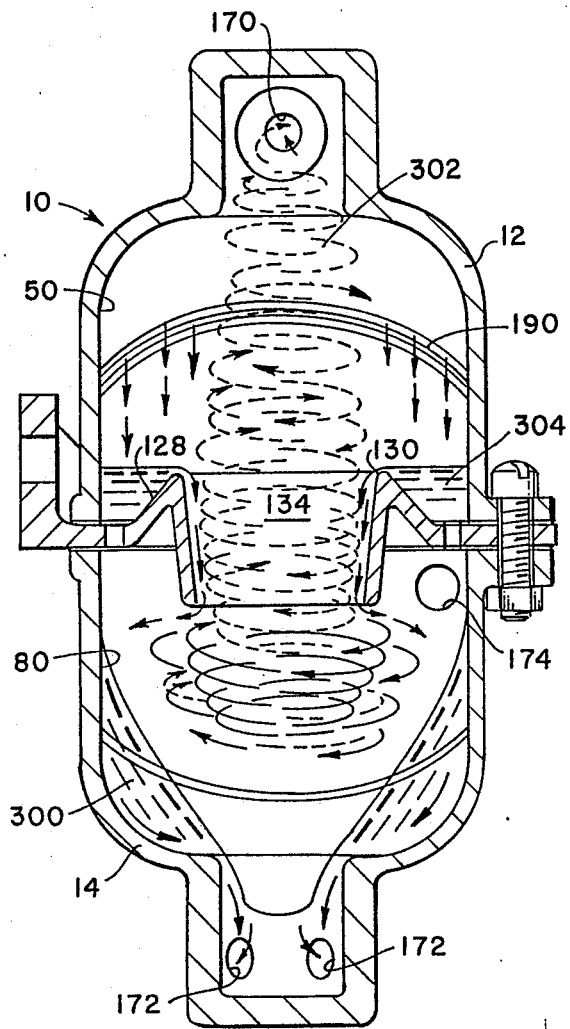
FIGS. 3 and 4 are schematic views showing the apparatus of the present invention in operation.

Referring initially to FIG. 1, apparatus 10 includes an upper chamber 12 and a lower chamber 14. Upper chamber 12 includes top 16, and lower chamber 14 includes bottom 18. A plurality of vapor conduits 20 are connected to top 16, and a plurality of liquid conduits 22 are connected to bottom 18. Preferably, a pair of two-phase inlet conduits 24 are connected to lower chamber 14. A partition member 26 is trapped between upper chamber 12 and lower chamber 14, and apparatus 10 is assembled by way of fasteners 28 extending through registered holes in suitable lugs extending from the outer surfaces of upper chamber 12, lower chamber 14 and partition member 26. A mounting boss 30 is formed on one side of partition member 26 for suitable mounting of apparatus 10.

Referring now to FIG. 2, upper chamber 12 has coaxially cylindrical inner and outer lower vertical walls 50 and 52, respectively. Inner and outer lower vertical walls 50 and 52 are joined at lower edges thereof by an upper flange surface 54. Upper chamber 12 further includes coaxially cylindrical inner and outer upper vertical walls 56 and 58, respectively. Inner and outer upper vertical walls 56 and 58 are of substantially lesser diameter than inner and outer lower vertical walls 50 and 52, respectively. Upper edges of lower inner and outer vertical walls 50 and 52 are joined to lower edges of upper inner and outer vertical walls 56 and 58 by inwardly-concave curved upper inner and outer shoulder walls 60 and 62, respectively. An upper edge 64 of upper outer cylindrical wall 58 is joined to outer top wall 66. An upper edge 68 of upper inner cylindrical wall 56 is joined to inner top wall 70.

Lower chamber 14 is substantially identical in configuration to upper chamber 12, having coaxially cylindrical inner and outer upper vertical walls 80 and 82, respectively. An upper flange surface 84 joins inner and outer upper vertical walls 80 and 82 at upper edges thereof. Lower chamber 14 has coaxially cylindrical inner and outer lower vertical walls 86 and 88 of substantially lesser diameter than inner and outer upper vertical walls 80 and 82, respectively. Lower edges of upper and inner outer vertical walls 80 and 82 are joined to upper edges of lower inner and outer vertical walls 86 and 88 by inwardly-concave curved lower inner and outer shoulder walls 90 and 92, respectively. A lower edge 94 of lower outer cylindrical wall 88 is joined to outer bottom wall 96, and lower edge 98 of lower inner cylindrical wall 86 is joined to an inner bottom wall 100.

Vertical walls 50, 52, 56, 58, 80, 82, 86 and 88 are all coaxial to one another and perpendicular to top walls 66 and 70 and bottom walls 96 and 100. In addition, the vertical, shoulder and top walls of upper chamber 12 are substantially identical in dimension to the vertical, shoulder and bottom walls, respectively, of lower chamber 14. Preferably, upper chamber 12 and lower chamber 14 are cast from a common mold with requisite differences between the two chambers effected by post-casting machining operations.

Partition member 26 is interposed between upper and lower chambers 12 and 14, with partition member 26 including upper and lower peripheral surfaces 120 and 122 opposite to and sealingly engaged with lower and upper flange surfaces 54 and 84, respectively. Partition member 26 also includes upper and lower annular surfaces 124 and 126 adjacent and extending inwardly from upper and lower peripheral surfaces 120 and 122, respectively, in the interior of chambers 12 and 14. An upwardly-tapered, partially-conical wall 128 extends inwardly from upper annular surface 124 to a circular weir edge 130. Weir edge 130 is located at a higher vertical location than upper annular surface 124, as shown in FIG. 2. Downwardly-tapered, partially-conical surface 132 extends inwardly from weir edge 130 to define a central aperture 134 between upper chamber 12 and lower chamber 14. Central aperture 134 is coaxial with vertical walls 50, 52, 56, 58, 80, 82, 86 and 88 and centrally located with respect to flange surfaces 54 and 84 and peripheral surfaces 120 and 122.

A plurality of vertically cylindrical walls 150 extend through partition member 26 between upper and lower annular surfaces 124 and 126. Walls 150 define transfer apertures 151 spaced equidistantly about annular surfaces 124 and 126, preferably spaced closely to flange surfaces 54 and 84 in the interior of chambers 12 and 14.

Vapor outlets 170 extend through upper vertical walls 56 and 58 of upper chamber 12, while liquid outlets 172 extend through lower vertical walls 86 and 88 of lower chamber 14. Two-phase inlets 174 extend through upper vertical walls 80 and 82 of lower chamber 14 in close vertical proximity to lower flange surface 84. Inlets 174 are disposed to admit two-phase flow in tangential relation to upper inner vertical wall 80 of lower chamber 14.

An upper screen assembly 190 is composed of a plurality of nested, downwardly-concave screens extending across lower inner vertical wall 50 of upper chamber 12. A unitary upwardly-concave lower screen 192 extends across upper inner vertical wall 80 of lower chamber 14. Upper screen assembly 190 is located approximately midway between partition member 26 and vapor outlets 170, while lower screen 192 is located approximately midway between partition member 26 and liquid outlets 172.

Figure 4:
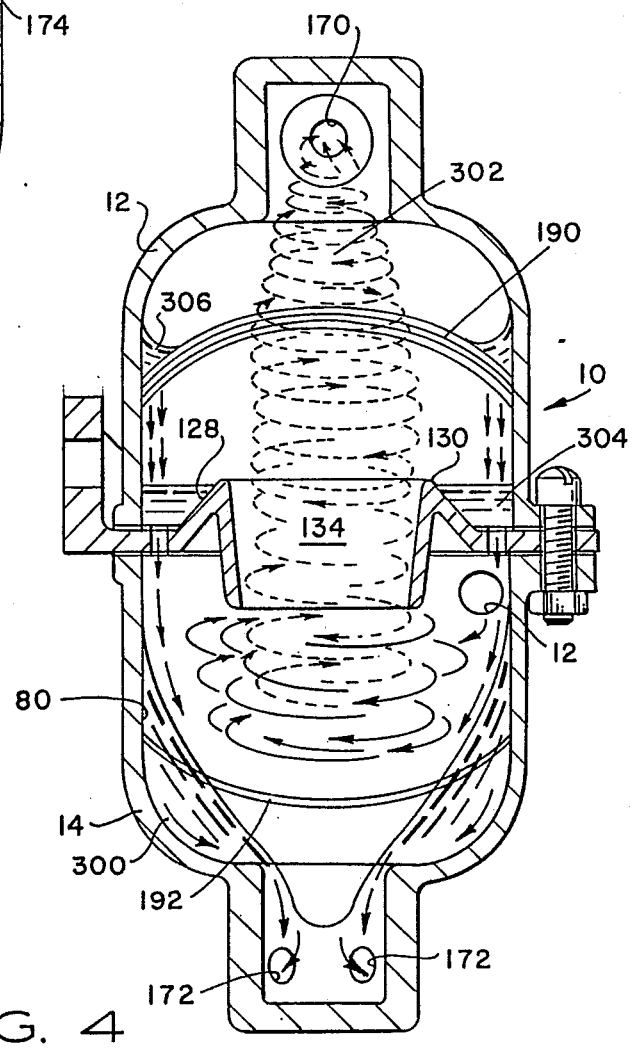

In operation, as shown in FIGS. 3 and 4, inlets 174 are so positioned to continually change the direction of the incoming ammonia, allowing the liquid ammonia 300 with less internal energy to collect on inner upper lower chamber wall 80 and move downward through a circular path due to gravity through lower screen 192, which dampens some of the inertia forces to even the flow to the liquid outlets 172.

Lower chamber 14 is separated from upper chamber 12 by partition member 26. The pressure will always be lower in the upper chamber 12 due to the movement of vaporous ammonia 302 to the vapor outlets 170 from lower chamber 14 through the central aperture 134 in a circular upward movement. Vaporous ammonia 302 is confined by the aperture wall 132, thereby providing a surface to collect the ammonia with less internal energy that moves upward with the flow over the weir edge 130, then down weir wall 128 and accumulates as pool 304. Pool 304 gradually re-enters lower chamber 14 either by gravity over weir edge 130 at the low flows (FIG. 3) or by Bernoulli's effect through transfer apertures 151 due to the incoming velocity of ammonia which is just under transfer apertures 151 at higher flows (FIG. 4). The upward flow of vaporous ammonia 302 through upper chamber 12 meets upper screen assembly 190 that is a spherical segment in shape with its crown up (downwardly-concave) and provides upper surfaces that are cooler than the lower surfaces due to the pressure difference. At lower flows (FIG. 3) condensed liquid will form on the lower surface of upper screen assembly 190 and drop off, as shown. Condensation will form on the upper surfaces and will collect in pool 306 around the outer edges of the upper screen assembly 190 at higher flows (FIG. 4). When the liquid head around the outer edges of pool 306 overcomes the pressure across the upper screen assembly 190, the liquid will flow down the inner lower wall 50 of upper chamber 12 where it will re-enter lower chamber 14 through transfer apertures 151.

The relation of flow resistance of the vapor outlets 170 to the liquid outlets 172 determines the degree of super saturation. The more resistance of vapor outlets 170, the less saturation at the liquid outlets 172, therefore providing a useful device for controlling the application of ammonia plant food by side dressing.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. Apparatus for dividing the gas and liquid components of a two phase flow of anhydrous ammonia, comprising:
    an upper chamber having an upper flange surface and a top;
    a lower chamber having a lower flange surface and a bottom;
    partition member interposed between said upper and lower flange surfaces, said partition member including walls defining a central aperture between said upper and lower chambers;
    the partition member having a plurality of transfer apertures between interiors of said upper and lower chambers; and
    at least one vapor outlet extending through said top of said upper chamber, at least one liquid outlet extending through said bottom of said lower chamber, and at least one two-phase inlet extending through said lower chamber disposed to admit two-phase flow in tangential relation to an internal surface of said lower chamber.

2. The apparatus of claim 1 wherein said upper chamber is substantially identical in dimension to said lower chamber.

3. The apparatus of claim 1 further comprising at least one upper screen extending across an inner wall of said upper chamber.

4. The apparatus of claim 1 wherein said partition member includes upper and lower peripheral surfaces opposite to and sealingly engaged with said lower and upper flange surfaces, respectively.

5. The apparatus of claim 1 wherein said upper chamber has coaxial cylindrical inner and outer lower vertical walls joined at lower edges thereof by said upper flange surface, said top of said upper chamber being defined by coaxial cylindrical inner and outer upper vertical walls of substantially lesser diameter than said inner and outer lower vertical walls, respectively.

6. The apparatus of claim 1 wherein said two-phase inlet is located in close vertical proximity to said lower flange surface.

7. The apparatus of claim 1 wherein said transfer aperture walls are vertically-cylindrical and located in close horizontal proximity to said to said flange surfaces, with said transfer apertures being spaced equidistantly about said flange surfaces interior said chambers.

8. The apparatus of claim 1 with said partition member including upper and lower peripheral surfaces opposite to and sealingly engaged with said lower and upper flange surfaces, respectively.

9. The apparatus of claim 1 with said partition member including a downwardly-tapered partially-conical wall defining a central aperture between inner vertical walls of said upper and lower chambers, with said central aperture being coaxial with said vertical walls and being centrally located with respect to said flange surfaces.

10. The apparatus of claim 1 with said partition member including a weir wall extending inwardly to a weir edge located at a higher vertical location than said upper flange surface, and said partition member further including an aperture wall extending inwardly from said weir edge to define a central aperture between said upper and lower chambers, with said central aperture being coaxial with said vertical walls and being centrally located with respect to said flange surfaces.

11. The apparatus of claim 1 wherein:
said upper chamber has coaxial cylindrical inner and outer lower vertical walls joined at lower edges thereof by said upper flange surface, said top of said upper chamber being defined by coaxial cylindrical inner and outer upper vertical walls of substantially lesser diameter than said inner and outer lower
vertical walls, respectively;
upper edges of said lower inner and outer vertical walls are joined to lower edges of said upper inner and outer vertical walls by inwardly-concave curved upper inner and outer shoulder walls, respectively;
an upper edge of said upper outer cylindrical wall is joined to an outer top wall, and an upper edge of said upper inner cylindrical wall is joined to an inner top wall;
said lower chamber has coaxial cylindrical inner and outer upper vertical walls joined at upper edges thereof by said lower flange surface;
said bottom of said lower chamber being defined by coaxial cylindrical inner and outer lower vertical walls of substantially lesser diameter than said inner and outer upper vertical walls, respectively;
lower edges of said upper inner and outer vertical walls are joined to upper edges of said lower inner and outer vertical walls by inwardly-concave curved lower inner and outer shoulder walls, respectively; and a lower edge of said lower outer cylindrical wall is joined to an outer bottom wall, and an lower edge of said lower inner cylindrical wall is joined to an inner bottom wall.

12. The apparatus of claim 11 with said vertical walls being perpendicular to said top and bottom walls, said vertical walls being coaxial, and said vertical, shoulder and top walls of said upper chamber being substantially identical in dimension to said vertical, shoulder and bottom walls, respectively, of said lower chamber.

13. Apparatus for dividing the gas and liquid components of a two phase flow of anhydrous ammonia, comprising:
an upper chamber having an upper flange surface and a top;
a lower chamber having a lower flange surface and a bottom;
a partition member interposed between said upper and lower flange surfaces, said partition member including walls defining an central aperture between said upper and lower chambers;
at least one vapor outlet extending through said top of said upper chamber, at least one liquid outlet extending through said bottom of said lower chamber, and at least one two-phase inlet extending through said lower chamber disposed to admit two-phase flow in tangential relation to an internal surface of said lower chamber; and
at least one lower screen extending across an inner wall of said lower chamber.

14. The apparatus of claim 13 wherein said lower screen is located aproximately midway between said partition member and said liquid outlet.

15. The apparatus of claim 14 wherein said lower screen is upwardly-concave.

16. Apparatus for dividing the gas and liquid components of a two phase flow of anhydrous ammonia, comprising:
an upper chamber having an upper flange surface and a top;
a lower chamber having a lower flange surface and a bottom;
a partition member interposed between said upper and lower flange surfaces, said partition member including walls defining an central aperture between said upper and lower chambers;
at least one vapor outlet extending through said top of said upper chamber, at least one liquid outlet extending through said bottom of said lower chamber, and at least one two-phase inlet extending through said lower chamber disposed to admit two-phase flow in tangential relation to an internal surface of said lower chamber;
at least one upper screen extending across an inner wall of said upper chamber; and
wherein said upper screen is located approximately midway between said partition member and said vapor outlet.

17. The apparatus of claim 16 wherein said upper screen is an assembly composed of a plurality of nested downwardly-concave screens.

18. Apparatus for dividing the gas and liquid components of a two phase flow of anhydrous ammonia, comprising:
an upper chamber having an upper flange surface and a top;
a lower chamber having a lower flange surface and a bottom;
a partition member interposed between said upper and lower flange surfaces, said partition member including walls defining an central aperture between said upper and lower chambers;
at least one vapor outlet extending through said top of said upper chamber, at least one liquid outlet extending through said bottom of said lower chamber, and at least one two-phase inlet extending through said lower chamber disposed to admit two-phase flow in tangential relation to an internal surface of said lower chamber;

wherein said upper chamber has coaxial cylindrical inner and outer lower vertical walls joined at lower edges thereof by said upper flange surface, said top of said upper chamber being defined by coaxial cylindrical inner and outer upper vertical walls of substantially lesser diameter than said inner and outer lower vertical walls, respectively; and wherein upper edges of said lower inner and outer vertical walls are joined to lower edges of said upper inner and outer vertical walls by inwardly-concave curved upper inner and outer shoulder walls, respectively.

19. The apparatus of claim 18 wherein an upper edge of said upper outer cylindrical wall is joined to an outer top wall, and an upper edge of said upper inner cylindrical wall is joined to an inner top wall.

20. Apparatus for dividing the gas and liquid components of a two phase flow of anhydrous ammonia, comprising:

an upper chamber having an upper flange surface and a top;

a lower chamber having a lower flange surface and a bottom;

a partition member interposed between said upper and lower flange surfaces, said partition member including walls defining an central aperture between said upper and lower chambers;

at least one vapor outlet extending through said top of said upper chamber, at least one liquid outlet extending through said bottom of said lower chamber, and at least one two-phase inlet extending through said lower chamber disposed to admit two-phase flow in tangential relation to an internal surface of said lower chamber; and wherein said lower chamber has coaxial cylindrical inner and outer upper vertical walls joined at upper edges thereof by said lower flange surface, said bottom of said lower chamber being defined by coaxial cylindrical inner and outer lower vertical walls of substantially lesser diameter than said inner and outer upper vertical walls, respectively.

21. The apparatus of claim 20 wherein lower edges of said upper inner and outer vertical walls are joined to upper edges of said lower inner and outer vertical walls by inwardly-concave curved lower inner and outer shoulder walls, respectively.

22. The apparatus of claim 21 wherein a lower edge of said lower outer cylindrical wall is joined to an outer bottom wall, and an lower edge of said lower inner cylindrical wall is joined to an inner bottom wall.

23. Apparatus for dividing the gas and liquid components of a two phase flow of anhydrous ammonia, comprising:

an upper chamber having coaxial cylindrical inner and outer lower vertical walls joined at lower edges thereof by an upper flange surface, said upper chamber further having coaxial cylindrical inner and outer upper vertical walls of substantially lesser diameter than said inner and outer lower vertical walls, respectively, upper edges of said lower inner and outer vertical walls being joined to lower edges of said upper inner and outer vertical walls by inwardly-concave curved upper inner and outer shoulder walls, respectively, an upper edge of said upper outer cylindrical wall being joined to an outer top wall, and an upper edge of said upper inner cylindrical wall being joined to an inner top wall;

a lower chamber having coaxial cylindrical inner and outer upper vertical walls joined at upper edges thereof by a lower flange surface, said lower chamber further having coaxial cylindrical inner and outer lower vertical walls of substantially lesser diameter than said inner and outer upper vertical walls, respectively, lower edges of said upper inner and outer vertical walls being joined to upper edges of said lower inner and outer vertical walls by inwardly-concave curved lower inner and outer shoulder walls, respectively, a lower edge of said lower outer cylindrical wall being joined to an outer bottom wall, and a lower edge of said lower inner cylindrical wall being joined to an inner bottom wall;

said vertical walls being perpendicular to said top and bottom walls, said vertical walls being coaxial, and said vertical, shoulder and top walls of said upper chamber being substantially identical in dimension to said vertical, shoulder and bottom walls, respectively, of said lower chamber;

a partition member interposed between said upper and lower chambers, said partition member including upper and lower peripheral surfaces opposite to and sealingly engaged with said lower and upper flange surfaces, respectively, and said partition member including upper and lower annular surfaces adjacent and extending inwardly from said upper and lower peripheral surfaces, respectively, interior said chambers, and said partition member further including an upwardly-tapered partially-conical weir wall extending inwardly from said upper annular surface to a circular weir edge located at a higher vertical location than said upper annular surface, and said partition member further including a downwardly-tapered partially-conical aperture wall extending inwardly from said weir edge to define a central aperture between said upper and lower chambers, with said central aperture being coaxial with said vertical walls and being centrally located with respect to said flange and peripheral surfaces;

a plurality of vertically-cylindrical walls defining transfer apertures spaced equidistantly about and communicating between said upper and lower annular surfaces, said transfer apertures being spaced closely to said flange surfaces interior said chambers;

at least one vapor outlet extending through said upper vertical walls of said upper chamber, at least one liquid outlet extending through said lower vertical walls of said lower chamber, and at least one two-phase inlet extending through said upper vertical walls of said lower chamber in close vertical proximity to said lower flange surface, said inlet being disposed to admit two-phase flow in tangential relation to said upper inner vertical wall of said lower chamber; and an upper screen assembly composed of a plurality of nested downwardly-concave screens extending across said lower inner vertical wall of said upper chamber, and a unitary lower upwardly-concave screen extending across said upper inner vertical wall of said lower chamber, with said upper screen assembly being located approximately midway between said partition member and said vapor outlet, and said lower screen being located approximately midway between said partition member and said liquid outlet.

* * * * *